Aug. 30, 1960    P. D. MERRILL ET AL    2,950,637
FITTING FOR TAPPING STEEL WALLED MEMBERS
Filed Nov. 24, 1958    2 Sheets-Sheet 1
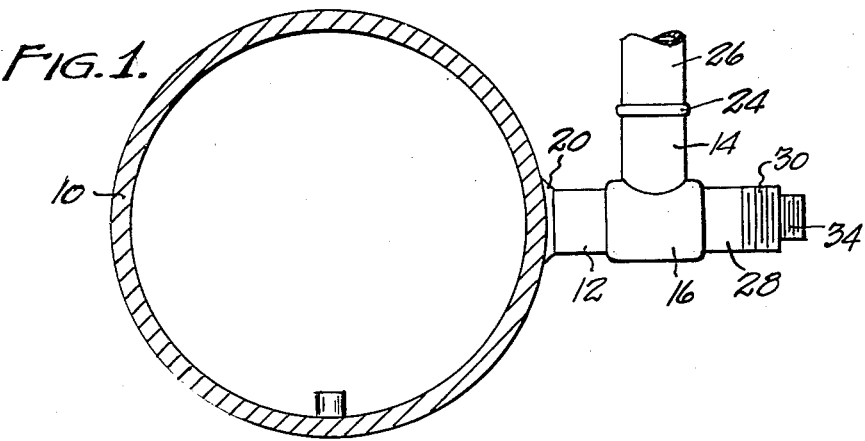
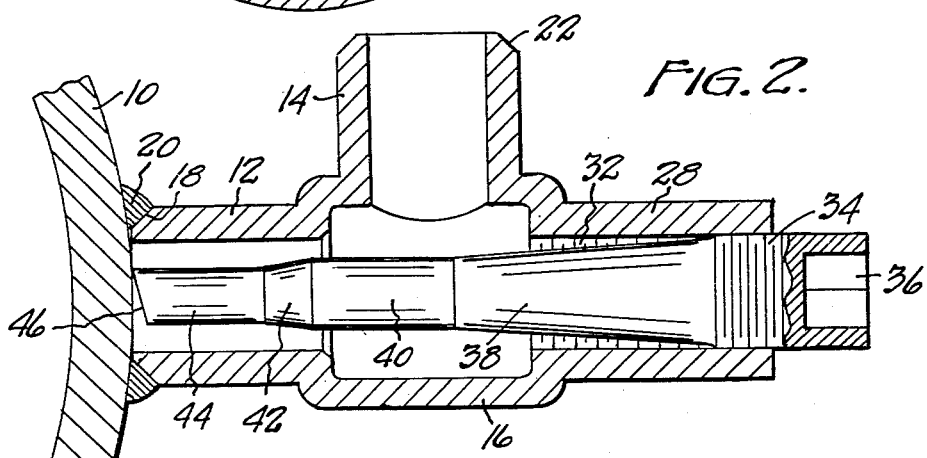
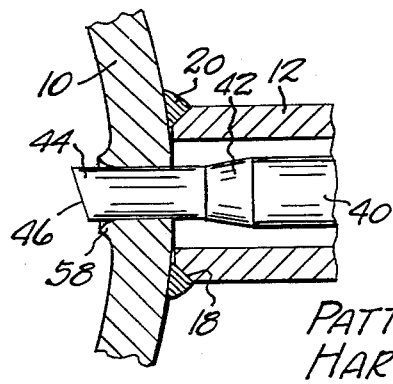
PATTERSON D. MERRILL
HARRY T. WAITE, JR.
INVENTOR.
BY Eugene O. Knoblock
ATTORNEY.

Aug. 30, 1960  P. D. MERRILL ET AL  2,950,637
FITTING FOR TAPPING STEEL WALLED MEMBERS
Filed Nov. 24, 1958  2 Sheets-Sheet 2
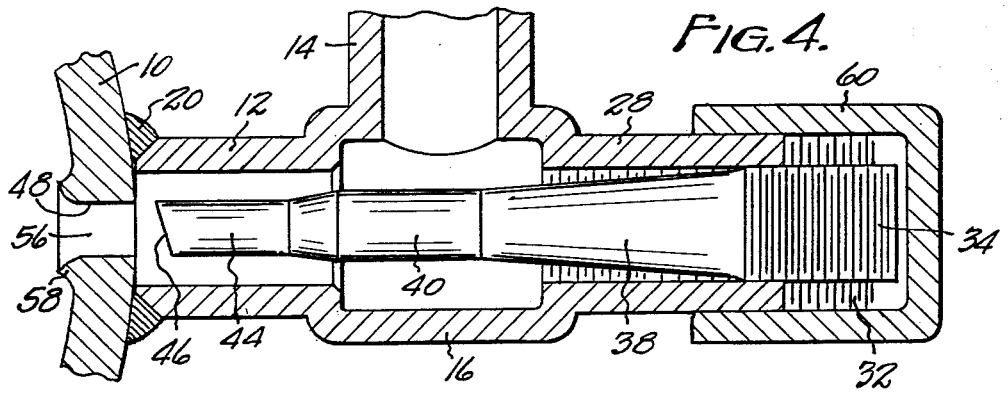
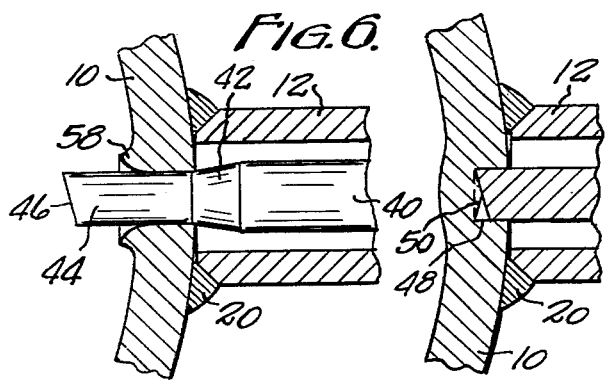
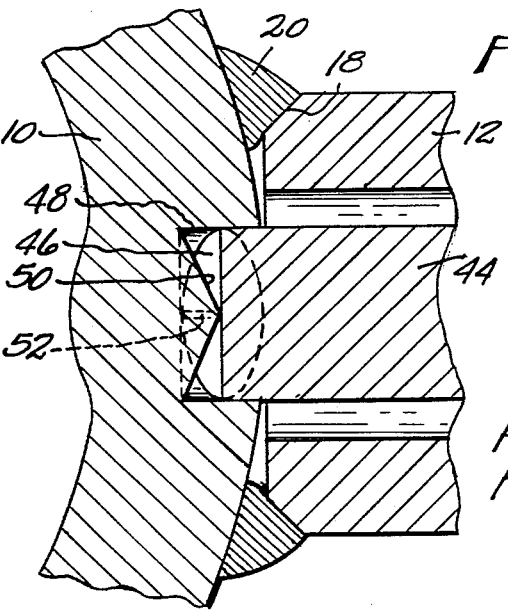
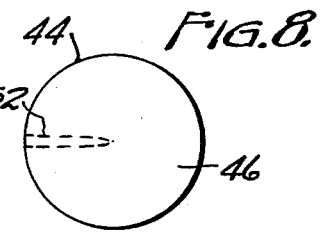
PATTERSON D. MERRILL
HARRY T. WAITE, JR.
INVENTOR.
BY Eugene C. Knoblock
ATTORNEY.

United States Patent Office 2,950,637
Patented Aug. 30, 1960

2,950,637

FITTING FOR TAPPING STEEL WALLED MEMBERS

Patterson D. Merrill and Harry T. Waite, Jr., South Bend, Ind., assignors to M. B. Skinner Company, South Bend, Ind., a corporation of Indiana Filed Nov. 24, 1958, Ser. No. 776,095

12 Claims. (Cl. 77—37)

This invention relates to a fitting for tapping steel walled members for the purpose of withdrawing fluid contents therefrom. The invention is particularly related to and useful for the tapping of fluid-containing members whose internal or fluid pressure is in the range between forty pounds per square inch and one hundred and twenty pounds per square inch, or more. One embodiment of the invention is particularly well suited for use as a branch pipe fitting.

The primary object of this invention is to provide a novel, simple and inexpensive device of this character which permits a tap to be made at any selected part and which accommodates connection of the fitting to the steel member, as by welding, prior to the operation of tapping the member and which effectively retains or confines fluid pressure without substantial or excessive or dangerous leakage, and which can be completely sealed after the tapping operation has been completed.

A further object of this invention is to provide a novel means for tapping a steel wall to pierce an opening therein.

A further object is to provide a device of this character wherein a conduit is welded to a steel wall circumferentially of the conduit and around the location at which the steel wall is to be pierced, whereby said branch conduit and its welded connection with said wall reinforces the area of the wall to be pierced, so that the piercing may be accomplished by a cutter having a swaging action which produces a plug severed from the steel wall as distinguished from a conventional drilling operation wherein shavings are produced by the cutting action thereof.

A further object is to provide a device of this character having a novel cutter screw-threaded in a tubular member welded at one end thereof to a steel member to be pierced, wherein the cutter has a reduced cutting end portion of substantially cylindrical outline, and a cutting edge defined by an oblique end surface of said reduced end portion.

A further object is to provide a device of this character wherein a cutter is screw-threaded in a tube circumferentially welded at one end to the member to be pierced, said cutting tool having a reduced diameter cutting end portion and an intermediate tapered portion adapted to be advanced for wedged sealing fit in an opening formed by the cutter, whereby the cutter forms a valve.

Other objects will be apparent from the following specification.

In the drawings:

Fig. 1 is a side view of my fitting applied to a steel pipe or other steel container, here shown in cross-section;

Fig. 2 is an enlarged longitudinal sectional view of our device, illustrating the same in starting position;

Fig. 3 is a fragmentary sectional view similar to Fig. 2, illustrating the piercing member at the end of the piercing operation;

Fig. 4 is an axial view similar to Fig. 2, illustrating the piercing tool withdrawn to permit flow therearound to an outlet and illustrating a sealing cap mounted upon the fitting;

Fig. 5 is a fragmentary axial sectional view illustrating an intermediate position in the piercing operation;

Fig. 6 is a fragmentary axial sectional view, illustrating the piercing member serving as a valve to seal the pierced opening;

Fig. 7 is a view enlarged on a greater scale than Fig. 5, and illustrating the manner in which the piercing action occurs; and Fig. 8 is an end view of the piercing tool, illustrating the area thereof which bears against the work in the performance of the piercing operation.

Referring to the drawings wherein the invention has been illustrated as a branch pipe fitting for use on high pressure fluid lines, such as high pressure gas lines containing gas at a pressure of from forty pounds to one hundred and twenty pounds per square inch, or more, the numeral 10 designates the pipe. The invention finds greatest utility when applied to pipes of a diameter of at least six inches. Such pipes usually have a wall thickness of .237 inch or more. It will be understood, however, that the member 10 may constitute a steel wall of a container or a steel plate, provided that the hardness of the walls thereof or of said plate is of the same order of hardness as is commonly found in steel pipe of the character described above.

A fitting, here shown as a branch pipe fitting and which may be clamped, welded or otherwise secured on pipe 10, has an open ended tubular portion 12 and a branch portion 14 communicating with and projecting laterally from an intermediate portion of the conduit 12 preferably at an enlarged part 16. The fitting is of a type commonly known as a T-fitting. In the form shown, one end of the conduit portion 12 will preferably be beveled at 18 to accommodate welding thereof at 20 to the member 10 to extend substantially perpendicular to the portion to which it is welded and, as here shown, to extend substantially radially of the pipe 10. The weld 20 extends circumferentially around the member 12 to provide a fluid-tight or sealed joint. The free end of the branch portion 14 is connected in any conventional manner to a branch pipe 26. As shown, part 14 is beveled at 22 to accommodate a welded circumferential sealed joint 24 with the end of a branch pipe 26 to which the contents of the pipe 10 are to be supplied. The end portion 28 of the conduit portion 12 of the fitting opposite the beveled end 18 thereof is externally screw-threaded at 30 and is internally screw-threaded at 32. The portion 28 is preferably elongated, and the internal threads 32 are preferably comparatively fine or of slow lead and preferably of the type having from 16 to 24 threads per inch.

An elongated piercing member has an elongated externally screw-threaded portion 34 at one end thereof which is screw-threaded in the conduit portion 28 meshing with the threads 32. A hexagonal or other non-circular tool-receiving socket 36 is preferably formed in the end of the portion 34 to receive a tool for rotating the piercing member. The piercing member is elongated and preferably of cylindrical cross-sectional shape throughout and, as here shown, includes a tapered portion 38 projecting from the threaded portion 34, an intermediate substantially cylindrical portion 40 of lesser diameter than the portion 34, a second tapered reduced portion 42 projecting from the portion 40, and a free end portion 44 of substantially cylindrical shape of a diameter substantially smaller than and preferably approximately one-half the diameter of the bore of the tube part 12.

As seen in Fig. 8, the cylindrical end portion 44 has no interruption in its circumference. The cylindrical portion 44 terminates in a flat end surface 46 disposed obliquely to the axis of the piercing member and preferably in a plane displaced from ten degrees to 35 degrees from a plane perpendicular to the axis of the piercing member and preferably approximately fifteen degrees displaced from a plane perpendicular to the axis of the piercing member. In one embodiment of the invention the terminal portion 44 of the piercing member will preferably be of a diameter of approximately three-eighths inches when fitting in a bore of the tube 12 which is approximately three-quarters of an inch in diameter. The piercing member will preferably be formed of a low carbon tool steel which has been hardened to maximum toughness without making it brittle. One steel which is particularly well suited for use in this piercing member is Allegheny Ludlum No. 609 of 60–75 carbon steel. It is also possible to use mild steel of the type used for products to be processed on screw machines after the same has been carburized and hardened. The length of the piercing member will be such that a substantial number of threads of the part 34 will intermesh with the threads 32 of the fitting at the time that the tip of the end portion 44 of the tool contacts the outer surface of the member 10 when the cutting action commences. A number of said threads will remain interengaged when the piercing member has been advanced to the Fig. 6 position at which the tapered portion 42 seats wedgingly or sealingly in a hole pierced in the member 10.

Assuming that the fitting has been welded at 20 to the work member 10 and at 26 to the conduit leading to the desired outlet to be supplied with the fluid content in the member 10, and that the piercing member has been inserted in the fitting, as illustrated in Fig. 2, the piercing or tapping operation is ready to commence. A wrench, such as a socket wrench, is utilized to rotate and advance the piercing member. The wrench will preferably have a handle of a length of at least fifteen inches in order to provide adequate leverage for the intended operation. The initial rotation of the piercing member serves to form a circular groove in the outer surface of the member 10 of substantially the same diameter as the diameter of the portion 44. As the piercing tool is rotated it advances axially at the rate of from 1/24 of an inch to 1/16 of an inch per revolution depending upon the lead of the screw-threads 32. Continued rotation of the piercing member advances it into the work by an action entailing swaging of the member 10 and the progressive forming of a recess in the outer surface of the member 10. As best seen in Figs. 5 and 7, as the recess is formed it has a substantially cylindrical side wall 48 and a substantially conical inner or end wall 50. The formation of the recess and the swaging of the wall 10 continues progressively and is characterized by a limited and only substantially linear area of contact of the end wall surface 46 of the tool with the inner end wall 50 of the work, as illustrated schematically by dotted lines at 52 in Figs. 7 and 8, which reduces to a minimum the frictional component of resistance to rotative advance of the piercing member and accommodates swaging or displacement of the wall 10, bit by bit, so as to produce minimum resistance to the operation and thereby accommodate its performance by manual pull upon a long handled wrench (not shown), as above described. The action continues progressively with the swaging ultimately resulting in the formation of a plug 54 punched out of the member 10 and of a diameter substantially equal to the diameter of the portion 44 of the piercing member. The operation is also characterized by the offsetting of the work piece 10 at the inner face thereof around the bore 56 pierced therein, which offsetting defines a substantially circular internally projecting burr or rib 58.

After the piercing tool has formed the bore 56, it may either be advanced to the position shown in Fig. 6 with the tapered portion 42 seating in the outer end of the bore with a wedged or tapered sealing fit, as illustrated in Fig. 6, for the purpose of sealing the bore 56, or it may be retracted to permit free flow of fluid through the opening 56 and the fitting into the conduit 26, as seen in Fig. 4. In the Fig. 4 position of the parts, the tip of the piercing tool is withdrawn to spaced relation from the member 10 while threads on the part 34 remain interengaged with the internal threads 32 of the fitting, thereby substantially maintaining a seal at the outer end of the tubular portion 12 of the fitting. In this position the piercing member has been withdrawn to provide freedom for flow of fluid contents from the bore 56 and around the reduced portions 44, 42 and 40 of the piercing member to enter the branch 14 in the conduit 26 connected thereto. Observe in this connection that the terminal part 44 of the tool is of a length substantially greater than the thickness of the wall 10. The tapered portion 42 is comparatively short, and it tapers at only a slight angle so that the portion 40 does not greatly exceed the cross-sectional size of the terminal portion 44. Also, the lengths of the parts are such that the part 40 in the withdrawn or flow position of the part shown in Fig. 4, is substantially confined to the chamber of the enlarged portion 16 of the fitting so that there is no substantial restriction provided thereby to flow within the fitting.

A cap 60 provided with internal threads may be screw-threaded upon the external screw-threads 30 on the end 28 of the fitting to provide a second seal against leakage at the portion 28 of the fitting when the piercing member is in the liquid flow position shown in Fig. 4. In other words, one seal against liquid leakage through the part 28 occurs in the intermeshing screw-threaded connection of the end 34 of the piercing member within the interior of the member 28, and a second seal occurs at the screw-threads between the cap 60 and the external screw-threads 30 of the fitting. The cap may be removed whenever it may be desired to manipulate the piercing member, as for the purpose of sealing the tap bore 56 by advance of the tapered valving part 42 thereof into wedged or seating engagement in the bore 56. The ability to use the piercing member as a valve as illustrated in Fig. 6 is important because it makes possible the disconnection of the conduit 26 from the fitting, followed by capping thereof to seal the neck 14 in a manner not shown herein but well understood in the art and similar to the manner in which the cap 60 serves to seal the end of the arm 28 of the fitting. This enables disconnection of a service line 26 at will without danger of leaking, without the necessity of removal of the fitting, and without danger of excessive leakage during the operation.

One important characteristic of the apparatus is the fact that the fitting, by reason of its close spaced circumferential substantially concentric weld at 20 to the member 10 to be pierced, serves as a reinforcement for the area to be pierced. This reinforcement reduces the distortion of the member 10 incident to the swage type piercing operation discussed above, and makes possible an efficient plug-punching piercing operation, as described. The formation of a plug is an important characteristic of the invention since such plug has substantial weight and will remain within a conduit 10 substantially in the position to which it falls by gravity after freeing thereof from the wall 10. In other words, the plug 54 will remain stationary in the container 10 under normal circumstances and will not be subject to movement in the container 10 incident to the flow of fluid under pressure therepast. Hence it is not a dangerous element in the conduit which might tend to foul a valve or to plug a branch opening. This is clearly distinguishable from the flow responsive movement likely to be produced if a conventional drilling operation were performed which produced chips of comparatively light weight and large size to be responsive to flow of fluid therepast and likely to be carried thereby to a position at which it could interfere with the proper flow of fluid in the conduit and associated parts.

While the preferred embodiment of the invention has been illustrated and described, it will be understood that changes in the construction may be made within the scope of the appended claims without departing from the spirit of the invention.

We claim:

1. In combination, a steel pipe, a fitting having a tubular part secured by a sealed connection at one end to said pipe in substantially radial relation to said pipe, said tubular part being internally screw-threaded at its opposite outer end portion, a branch outlet intermediate the ends of said tubular part, and a rigid elongated member screw-threaded at one end in the outer portion of said fitting and having a reduced concentric cylindrical end portion having clearance in the tubular part between said pipe and said branch outlet, said reduced end portion having an oblique end face extending thereacross whereby said member is configured to engage and pierce a hole in said pipe as it is advanced by rotation, said reduced end portion accommodating flow of fluid therepast to said outlet when it is withdrawn from said hole, the threaded portions of said piercing member and fitting engaging to seal the outer end of said fitting.

2. The combination defined in claim 1, wherein said piercing member has a tapered portion intermediate its length and adjacent said pipe-piercing portion, said tapered portion sealing said pipe hole with a wedged fit when said piercing member is advanced inwardly in said fitting.

3. The combination defined in claim 1, and a cap removably and sealingly mounted on the outer end of said fitting.

4. The combination defined in claim 1, wherein the oblique end face of the reduced end portion of said piercing tool is substantially plane and extends at an angle of approximately 15 degrees from a plane perpendicular to the axis of said member.

5. The combination defined in claim 1, wherein the oblique end face of the reduced end portion of said piercing tool is substantially plane and extends at an angle between ten degrees and thirty-five degrees displaced from a plane perpendicular to said member.

6. The combination defined in claim 1, wherein the oblique end face of the reduced end portion of said piercing tool is substantially plane and extends at an angle between 10 degrees and 35 degrees displaced from a plane perpendicular to said member, the interengaging threaded portions of said fitting and piercing member having from sixteen to twenty-four threads per inch.

7. Means for piercing the wall of a steel member of substantially uniform thickness, comprising a tube adapted to engage said wall and to project substantially perpendicularly therefrom, an elongated piercing member, means carried by said tube for positioning said piercing member substantially coaxially in said tube and for retatively and axially shifting said piercing member in said tube, said piercing member being formed of a metal harder than said wall and having a substantially cylindrical concentric wall-engaging end portion of a diameter smaller than the inner diameter of the part of said tube adjacent said wall, said reduced end portion having an oblique flat end face extending thereacross.

8. Means for piercing the wall of a steel member of substantially uniform thickness, comprising a tube adapted to engage said wall and to project substantially perpendicular therefrom, an elongated piercing member, means carried by said tube for positioning said piercing member substantially coaxially in said tube and for rotatively and axially shifting said piercing member in said tube, said piercing member being formed of a metal harder than said wall and having a substantially cylindrical concentric wall-engaging end portion of a diameter smaller than the inner diameter of the part of said tube adjacent said wall, said reduced end portion having an oblique flat end face extending thereacross at an angle of approximately 15 degrees from a plane perpendicular to the axis of said piercing member.

9. Means for piercing the wall of a steel chamber of substantially uniform thickness, comprising a tube adapted to engage said wall and to project substantially perpendicularly therefrom, an elongated piercing member, means carried by said tube for positioning said piercing member substantially coaxially in said tube and for rotatively and axially shifting said piercing member in said tube, said piercing member being formed of a metal harder than said wall and having a substantially cylindrical concentric wall-engaging end portion of a diameter smaller than the inner diameter of the part of said tube adjacent said wall, said reduced end portion having an oblique flat end face extending thereacross, said advancing means shifting said piercing member axially at a rate of between $\frac{1}{16}$ and $\frac{1}{24}$ of an inch per revolution.

10. Means for piercing the wall of a steel member of substantially uniform thickness, comprising a tube adapted to engage said wall and to project substantially perpendicular therefrom, an elongated piercing member, means carried by said tube for positioning said piercing member substantially coaxially in said tube and for rotatively and axially shifting said piercing member in said tube, said piercing member being formed of a metal harder than said wall and having a substantially cylindrical concentric wall-engaging end portion of a diameter smaller than the inner diameter of the part of said tube adjacent said wall, said reduced end portion having an oblique flat end face extending thereacross at an angle of approximately 15 degrees from a plane perpendicular to the axis of said piercing member, said advancing means comprising interfitting screw-threads on said tube and piercing member spaced from said wall and characterized by from 16 to 24 threads per inch.

11. A device of the character defined in claim 7, wherein said piercing member has a concentric frusto conical portion flaring from said reduced end portion and spaced from said oblique end face a distance greater than the thickness of said wall.

12. A device of the character defined in claim 7, wherein said positioning means constitutes an internally screw-threaded end portion of said tube and an externally threaded enlarged end portion of said piercing member mating with said threaded tube end portion.

References Cited in the file of this patent

UNITED STATES PATENTS

| Re. 24,199 | McDonald | Aug. 21, 1956 |

FOREIGN PATENTS

| 138,216 | Australia | Aug. 7, 1950 |